Figure 1:
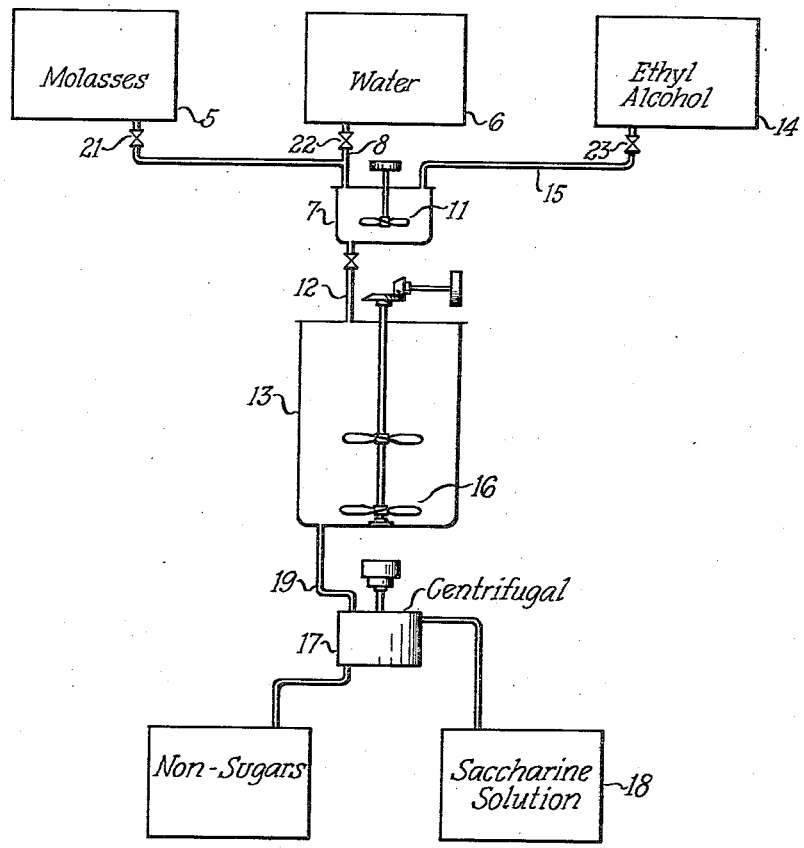

Sept. 13, 1938. G. T. REICH 2,130,029

PROCESS FOR THE RECOVERY OF NONSUGARS FROM LIQUID SACCHARINE MATERIALS

Filed April 24, 1936

INVENTOR.
GUSTAVE T. REICH
BY
ATTORNEYS.

Patented Sept. 13, 1938

2,130,029

UNITED STATES PATENT OFFICE 2,130,029

PROCESS FOR THE RECOVERY OF NON-SUGARS FROM LIQUID SACCHARINE MATERIALS

Gustave T. Reich, Philadelphia, Pa.

Application April 24, 1936, Serial No. 76,120

6 Claims. (Cl. 127—53)

My process produces, without requiring any preliminary fermentation of the invert sugar or the saccharine material, a separation of the nonsugars from an aqueous mixture or solution of the waste saccharine materials in which they were contained. It produces also, these nonsugars in a state where they are uncontaminated by any inorganic precipitant, and, practically, in a pure condition, and entirely or nearly freed from saccharides; and where my process is carried out in the way I regard as best, these pure nonsugars are collected in a semi-solid condition. This condition is very advantageous where no separation from each other of the nonsugars is desired, or where, only after their recovery from the saccharine and solution, a selective separation between organic and inorganic nonsugars is to be accomplished.

I have found that where a particular proportion of water to the solids in the saccharine material is maintained, and ethyl alcohol is added to the solution of a saccharine material in the very high ratio by volume that I have defined below, to the water content of the solution (both of these ratios are critical) so that, without any other precipitating material being required, the sucrose and invert sugar are dissolved in the dilute alcohol (or perhaps more exactly in the water dissolved in the alcohol) and the water is withdrawn from the nonsugars directly, causing their precipitation without adding any other precipitant, and their collection as a viscous or semisolid mass. I discovered that if an aqueous dilution of the saccharine material was made in which the aqueous content was approximately equal to the solid content, and ethyl alcohol, is added to the mixture in a volume ratio that was greater than 60:40 and preferably is used between that ratio and 80:20, more nearly approaching the higher proportion of ethyl alcohol, the saccharides and many of the adulterant materials would remain in the solution, and the inorganic salts such as potash, and organic compounds such as gums and nitrogenous bodies, which are the valuable nonsugars would be precipitated in a pure condition without any chemical change and without any foreign deleterious addition such as is produced where a precipitant that combines with a nonsugar is used to separate sucrose and nonsugars.

The discovery rests on the following facts: Sucrose is not soluble in absolute ethyl alcohol, but is soluble in diluted ethyl alcohol. The alcohol combines with some of the water contained in the saccharine material, withdrawing water from this mixture. This mixture contains sucrose, glucose, etc., in aqueous solution or otherwise in aqueous combination, and also nonsugars, (potashes, gums, etc.) in aqueous combination. When the alcohol withdraws the water from the mixture, it withdraws it from the materials that part most readily from it. I have discovered that the nonsugars part with their water more readily than the sugars do. The alcohol, therefore, will withdraw water from the nonsugars, precipitating them, leaving the sugars still dissolved; and hence I have discovered that when a saccharine material containing nonsugars such as mentioned below is treated with dilute alcohol, it results in the formation of an aqueous sugar solution, rather than an aqueous solution of inorganic salts and the gums and nitrogenous bodies, and withdraws the water in which the latter are dissolved from them, when the total aqueous content in the mixture is insufficient to dissolve both the saccharides and nonsugars, leaving the sugars still in solution with other adulterants and precipitating and depositing the gums, nitrogenous bodies and potashes in an unaltered state, free from saccharides, provided, of course, the substantial proportions of alcohol, water and solids above set forth are maintained.

The potashes, gums and nitrogenous bodies are today the valuable constituents of sugar solutions from which most of the sucrose previously had been extracted; but these nonsugars are required to be free from sucrose and from many other additional adulterants. The only commercial value of the residue from which the potashes, or other nonsugars have been recovered, lies in the possibility of fermenting and distilling it. This ordinarily will not repay the cost of processing. For many years the price at which commercial sugar can be produced and is sold, made such a residue valueless for sugar production.

The saccharine materials that are treatable by the instant process are cane or beet sugar juice, molasses, sugar house waste materials, sweet waters, or similar materials.

Figure 2:
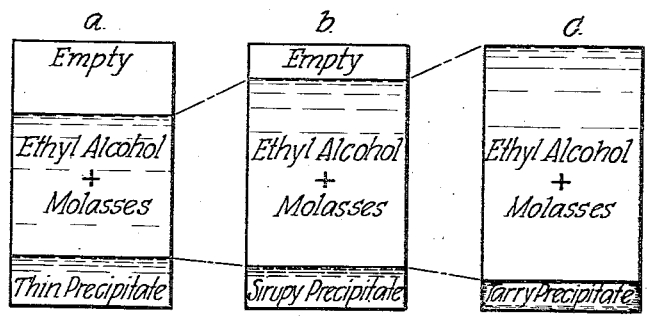

Fig. 1 is a diagrammatic flow sheet, and Fig. 2 is a diagram wherein the progressive stages of the formation of the final product is attained. 5 indicates a volume of molasses, 6 a volume of water, and 14 a volume of ethyl alcohol. The three materials are mingled in a primary mixer 7, by an agitator 11, the flow being controlled by the valves 21, 22 and 23, the molasses and water entering the mixer together by the pipe 8. The mixed materials pass by a valve controlled pipe 12 into the secondary mixer 13, wherein they are agitated by an agitator 16. From this receptacle the nonsugars may be removed directly. The remaining liquid may then be passed by pipe 19 to a centrifugal 17, where an additional amount of nonsugars may be salvaged, and the sugar squeezed out of them, and the saccharine solution remaining led into a vat 18 for the removal of the alcohol from it; additional nonsugars being saved.

In Fig. 2 is schematically shown the progress of the formation of the tarry nonsugars. A indicates an incomplete stage, where the nonsugars are beginning to precipitate, mixed with much water, B where more alcohol has been added, and more water drawn from the precipitated nonsugars, C where practically all water has been withdrawn from the nonsugars, leaving them as an almost solid tarry precipitate.

I practice my instant process by producing a mixture of the saccharine materials. (molasses, etc., as above enumerated) with water, so that the total aqueous content of the mixture substantially equals in volume the solid content of the saccharine materials, and combine this mixture with ethyl alcohol, making the proportion of absolute alcohol to the water of the mixture, by volume, from 60:40 to 80:20, the latter being a quantity of alcohol sufficient to dissolve with the water to form a solution where the sugars will remain still dissolved, but the potashes and nitrogenous bodies will be deprived of the water of solution to an extent that will cause them to precipitate and deposit. A slightly larger proportion of alcohol than the upper limit above set forth will tend to precipitate, also, saccharides; i. e. sucrose, levulose and glucose. A lesser amount will not produce a deposit of the potashes and other nonsugars desired to be recovered. The water can be introduced directly into the saccharine material and mixed thoroughly with it by agitation, stirring, or other convenient means, or the quantity of water and alcohol required can be determined, and water diluted alcohol mixed thoroughly with the saccharine material, with stirring and agitation. The whole action takes place preferably in the cold. If the molasses or other sugar containing material is mixed with the water previously to the introduction of the alcohol, this mixture may be heated and then cooled prior to the introduction of the alcohol. There is no heating developed during the process.

Preferably, however, I proceed by diluting with water the saccharine material to the extent named and then add gradually the ethyl alcohol. As the quantity of alcohol approaches the critical limit, the potashes, gums and similar organic nonsugars begin to separate as a syrupy liquid, which, upon the addition of more ethyl alcohol gradually contracts in volume and becomes pasty, and then finally, contracting still more, becomes a viscous, almost solid mass.

The deposited viscous material may be removed, and the liquid containing the sugar distilled to recover the latter, or the mixture may be fermented to convert the sugar into alcohol, and the alcohol from the fermentation distilled out with the alcohol that had been added to the aqueous mixture. The large proportion of alcohol in the liquid containing the sugar in solution, will enable the greater proportion of its contained alcohol to be recovered with great ease, and the alcohol in the recovered nonsugars is recovered, readily and in a high proof, because little water is left in these materials at the termination of my process. In cases where the quantity of water in the saccharine material is already greater than a ratio of 1:1 with the solids, this proportion may be modified by mixing in a saccharide having less water content, or the excess water content may be removed, for instance, by evaporation. For example, sweet waters may be mixed with molasses.

*Example No. 1.*—A process for the extraction of the potash from molasses. Molasses is known to the trade as anhydrous, when free from mixed water—as original when it contains water mixed with it between 10% and 20%—and as a molasses solution when it contains substantially more than 20% of water mixed with the molasses. I take 100 gallons of original molasses (say having 20 gallons of water) and add to and mix with it 60 additional gallons of water. This will make the amount of solids and water in the dilute molasses almost equal. I mix and agitate, keeping the mixture at atmospheric temperature. I then add ethyl alcohol, about 75 to 25 parts of commercial alcohol to the aqueous material in the molasses solution. This will cause the separation of the potash nitrogenous bodies and any gums, as a viscous mass. I then add more alcohol as the viscous mass shrinks and becomes constantly more viscous, stopping the adding of alcohol before saccharides begin to precipitate, which, if permitted to occur, would make the precipitated nonsugars worthless.

*Example No. 2.*—The aqueous content of the original molasses is determined experimentally, and a diluted ethyl alcohol is prepared in which the water is 35% of the solution. This mixture and the original molasses are then mixed in proportions about 65% of the alcohol mixture to 35% of the original molasses, and then more ethyl alcohol is added and the deposited nitrogenous potash bodies and gums are of a medium size and maximum density.

The separation of the nonsugary mass may be accomplished in many ways, and no particular kind of separation is a limitation on my invention. Nor is the disposal of the liquid, nor the particular distillation process for recovering the alcohol from it, and when the critical proportions are maintained many changes may be made without departing from my invention, and I do not limit myself to less than the following claims.

I claim:

1. The process of recovering nonsugars in a substantially solid condition and free from sucrose from solutions of saccharides of the group composed of molasses, cane or beet juices, and sugar house waste such as sweet waters and similar materials, and containing in solution nonsugars of the group of bodies having the common property of being dehydrated by alcohol and composed of potashes, gums, amido compounds, and similar nitrogenous bodies and aconitic acid, comprising making the aqueous content of the mixture equal its solid content and mixing with the mixture ethyl alcohol, the proportion of the alcohol to the water contained in the solution being between 60:40 and 80:20 and agitating the mixture until the nonsugars are precipitated and collected in a semi-solid mass.

2. The process of recovering nonsugars in a substantially solid condition and free from sucrose from solutions of saccharides of the group composed of molasses, cane or beet juices and sugar house wastes such as sweet waters and similar materials, and containing, in solution, nonsugars of the group of bodies having the common property of being dehydrated by alcohol and composed of potashes, gums, amido compounds and similar nitrogenous bodies and aconitic acid, comprising making the aqueous content of the mixture equal to its solid content and mixing with the mixture ethyl alcohol, the proportion of the alcohol to the water contained in the mixture being substantially 80:20 and agitating the mixture until nonsugars are precipitated as a semi-solid mass.

3. The process of recovering nonsugars in a substantially solid condition and free from sucrose from solutions of saccharides of the group composed of molasses, cane or beet juices and sugar house waste such as sweet waters and similar materials, and containing also in solution nonsugars of the group of bodies having the common property of being dehydrated by alcohol and composed of potashes, gums, amido compounds and similar nitrogenous bodies and aconitic acid, comprising making the quantity of solids and water equal, in the solution, and then mixing gradually with this solution ethyl alcohol until the proportion of alcohol to the water of the mixture is substantially 80:20.

4. The process of recovering nonsugars in a substantially solid condition and free from sucrose from a solution of saccharides of the group composed of molasses, cane or beet juices and sugar house waste such as sweet waters and similar materials, and containing also in solution nonsugars of the group of bodies having the common property of being dehydrated by alcohol and composed of potashes, gums, amido compounds and similar nitrogenous bodies and aconitic acid, comprising making substantially equal the quantity of water and solids in the solution and adding gradually while agitating ethyl alcohol until a proportion over 60% of alcohol to 40% of the aqueous content of the solution and ceasing to add further alcohol before a precipitation of sugar begins, whereby a precipitation and collection of the nonsugars in a pure state is attained.

5. The process of recovery in a semi-solid mass of the nonsugars contained in the aqueous solutions of the group composed of molasses, beet and cane juices, sweet waters and similar materials by making this solution, so that the ratio of solids in the solution to water in the solution is approximately 1:1 and withdrawing the water of solution from the nonsugars by adding ethyl alcohol in proportion in excess of 60:20 of the water content of the solution but in a proportion not exceeding 80:20.

6. The process of obtaining from sugar waste products commercially valuable nonsugars in a substantially solid state from saccharine material, comprising mixing water and ethyl alcohol with a saccharine material of the group of bodies having the common property of being dehydrated by alcohol and consisting of molasses, cane and beet juice and sweet waters, such saccharine material containing at least one of the group of nonsugars consisting of potashes, gums, aconitic acid and amido compounds; the quantity of water being substantially equal in volume to the quantity of solid material in the saccharine material, and the proportion of ethyl alcohol to water content being between 60% of alcohol to 40% of water, and 80% of alcohol to 20% of water, agitating the mixture until its nonsugar content precipitates and deposits as a substantially solid mass and then collecting separately the deposited mass of nonsugars.

GUSTAVE T. REICH.